United States Patent
Yang

(10) Patent No.: US 8,805,343 B2
(45) Date of Patent: Aug. 12, 2014

(54) COMMUNICATION DEVICE, STORAGE MEDIUM AND METHOD FOR PROCESSING INSTANT INFORMATION USING THE COMMUNICATION DEVICE

(75) Inventor: Cheng-Kuo Yang, New Taipei (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 143 days.

(21) Appl. No.: 13/439,836

(22) Filed: Apr. 4, 2012

(65) Prior Publication Data

US 2012/0289261 A1    Nov. 15, 2012

(30) Foreign Application Priority Data

May 10, 2011    (TW) ............................. 1001116255 A

(51) Int. Cl.
H04M 3/42     (2006.01)
H04W 4/16     (2009.01)
H04W 4/20     (2009.01)

(52) U.S. Cl.
CPC . *H04W 4/16* (2013.01); *H04W 4/20* (2013.01)
USPC ...................... 455/414.2; 370/338; 379/88.23; 455/230

(58) Field of Classification Search
USPC ........ 370/259, 462, 338; 379/201.01, 201.02, 379/201.03, 88.23; 455/404.1, 414.1, 455/414.2, 414.3, 414.4, 230; 710/107; 382/240; 725/153
See application file for complete search history.

(56) References Cited

U.S. PATENT DOCUMENTS

| | | | | |
|---|---|---|---|---|
| 5,894,506 | A * | 4/1999 | Pinter | 379/88.23 |
| 6,512,930 | B2 * | 1/2003 | Sandegren | 455/518 |
| 6,671,508 | B1 * | 12/2003 | Sugano et al. | 455/412.1 |
| 7,085,253 | B2 * | 8/2006 | Yang | 370/338 |
| 2001/0024951 | A1 * | 9/2001 | Rignell et al. | 455/414 |
| 2004/0176076 | A1 * | 9/2004 | Uppuluri | 455/414.1 |
| 2004/0259540 | A1 * | 12/2004 | Banerjee et al. | 455/425 |
| 2007/0190956 | A1 * | 8/2007 | Chen et al. | 455/230 |

\* cited by examiner

*Primary Examiner* — Mahendra Patel
(74) *Attorney, Agent, or Firm* — Novak Druce Connolly Bove + Quigg LLP

(57) ABSTRACT

In a method for processing information using a communication device, a plurality of specific events of the communication device sets a receiver number of a receiver device. A specific message comprising predetermined characters and state information of the communication device is compiled, upon the condition that one of the specific events is triggered. The specific message is sent to the receiver device according to the receiver number.

10 Claims, 4 Drawing Sheets

COMMUNICATION DEVICE, STORAGE MEDIUM AND METHOD FOR PROCESSING INSTANT INFORMATION USING THE COMMUNICATION DEVICE

BACKGROUND

1. Technical Field

The present disclosure relates to message process devices and methods, and more particularly to a communication device, a storage medium and a method for processing instant information using the communication device.

2. Description of Related Art

Communication devices, such as, mobile phones, are instant and convenient communication tools for users to communicate with each other. However, if a user wants to call a friend but does not know whether the friend is free to have a phone call currently, the user may encounter the following situations: the phone call to the friend cannot be connected, the phone call is busy, or the friend does not answer the phone call, for example. Thus, the intended communication may be delayed or lost, which is an unfavorable situation for the user and the friend.

BRIEF DESCRIPTION OF THE DRAWINGS

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
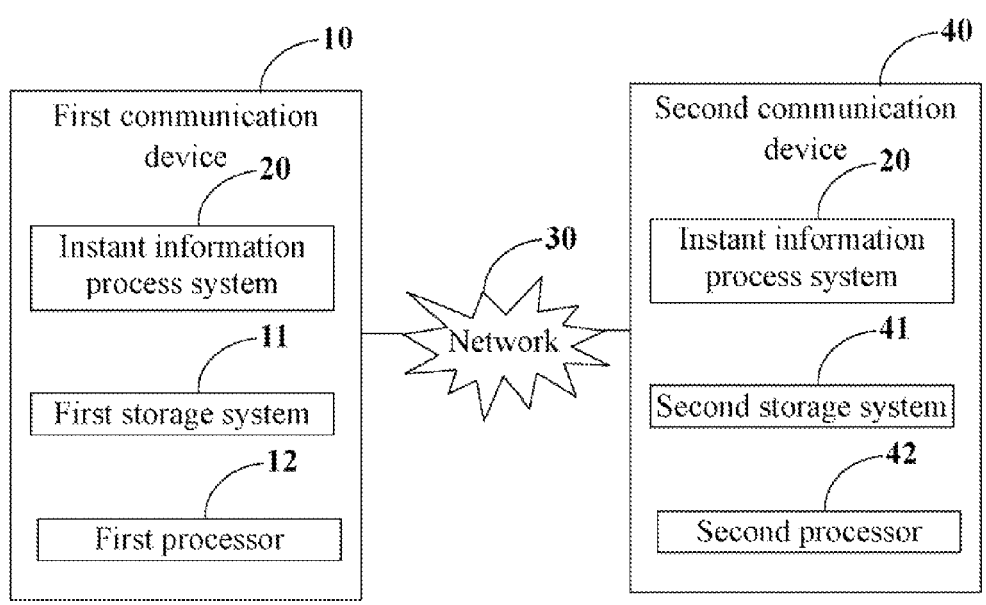
FIG. 1 is a block diagram of one embodiment of a first communication device and a second communication device including an instant information process system.

FIG. 1 is a block diagram of one embodiment of a first communication device 10 and a second communication device 40 including an instant information process system 20. The first communication device 10 communicates with the second communication device 40 through a network 30, such as, a Global System for Mobile Communications (GSM) network, or a code division multiple access (CDMA) network. For simplification, in the embodiment, the first communication device 10 is considered as a sender device for sending messages to the second communication device 40, and the second communication device 40 is considered as a receiver device for receiving the messages from the first communication device 10. In another embodiment, the first communication device 10 can be the receiver device, and the second communication device 40 can be the sender device. The instant information process system 20 may send and receive a specific message including state information of the sender device between the first communication device 10 and the second communication device 40, and mark the state information on the receiver device. In one embodiment, the message in the application represents a Short Messaging Service (SMS) message.

The first communication device 10 further includes a first storage system 11 and a first processor 12. The second communication device 40 includes a second storage system 41 and a second processor 42. The first and second storage systems 11 and 41 store data for their respective devices. The first storage system 11 or the second storage system 41 may be a memory, an external storage card, such as a smart media card, or a secure digital card. Both of the first and second processors 12 and 42 execute one or more computerized codes and other applications for their respective devices, to provide the functions of the instant information process system 20.

Figure 2:
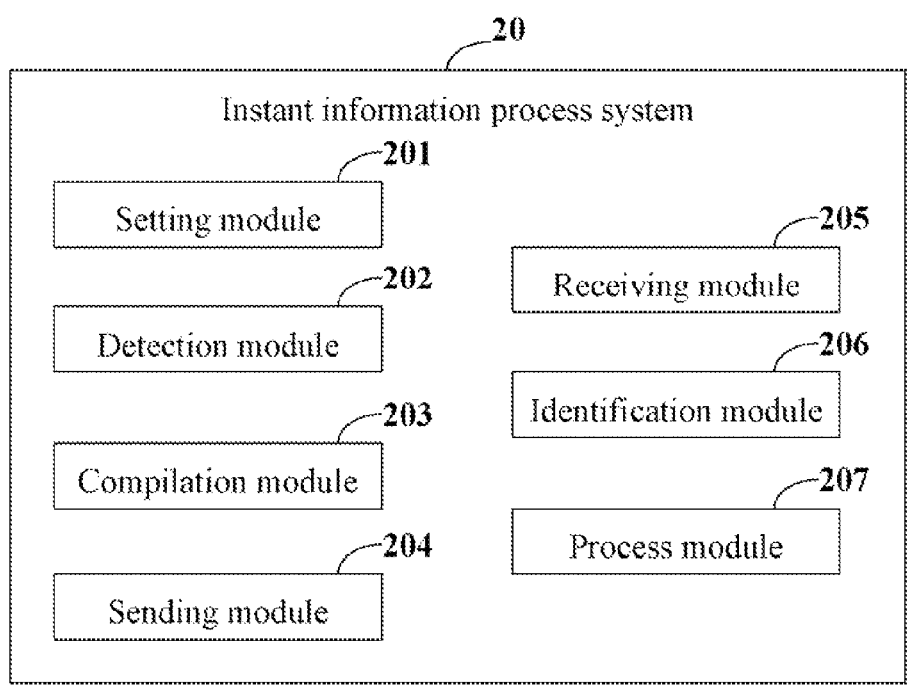
FIG. 2 is block diagram of function modules of the instant information process system in the first and second communication device of FIG. 1.

FIG. 2 is a block diagram of function modules of the instant information process system 20 in the first communication device 10 and in the second communication device 40 of FIG. 1. In the embodiment, the instant information process system 20 may include a setting module 201, a detection module 202, a compilation module 203, a sending module 204, a receiving module 205, an identification module 206, and a process module 207. The modules 201, 202, 203, 204, 205, 206, and 207 comprise computerized codes in the form of one or more programs that may be stored in each of the first storage system 11 and the second storage system 41. The computerized code includes instructions that are executed by the first processor 12 or the second processor 42 to provide functions for the modules. In one embodiment, if the first communication device 10 is the sender device, the first communication device 10 runs the modules 201, 202, 203 and 204 for sending the message. If the second communication device 40 is the receiver device, the second communication device 40 runs the modules 205, 206 and 207 to receive the message. Details of these operations follow.

Figure 3:
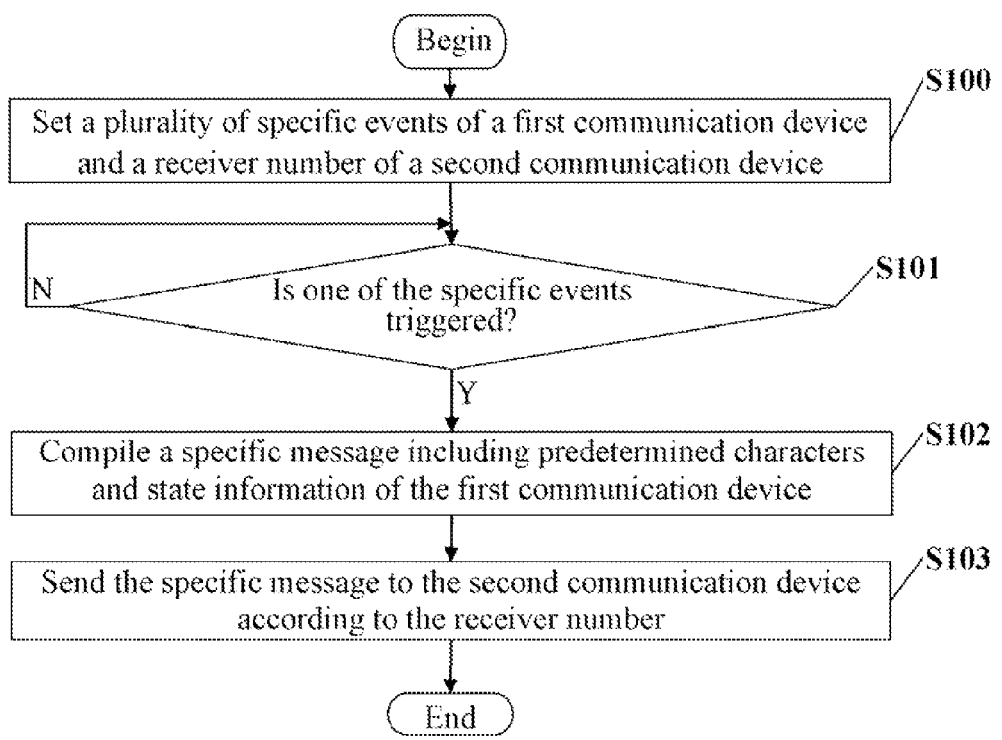
FIG. 3 is a flowchart of one embodiment of an instant information process method for sending a message from the first communication device of FIG. 1.

FIG. 3 is a flowchart of one embodiment of an instant information process method for sending a message from the first communication device 10 of FIG. 1. Depending on the embodiment, additional blocks may be added, others deleted, and the ordering of the blocks may be changed.

In block S100, the setting module 100 sets a plurality of specific events of the first communication device 10, and sets a receiver number of the second communication device 40 in the first communication device 10. The receiver number is a phone number of a receiver device (e.g., the second communication device 40) that is used for receiving messages from a sender device (e.g., the first communication device 10). In other embodiments, the setting module 201 may set a plurality of receiver numbers of other communication devices.

In one embodiment, the specific events include a first event type representing that the first communication device 10 is in a busy state, such as, an event of the first communication device 10 starting answering a phone call, an event of a profile of the first communication device 10 being changed to be a silence mode or a vibration mode, or an event of a system time of the communication device 10 arriving at a start time of a meeting scheduled in the communication device 10, for example. The specific events further includes a second event type representing that the first communication device 10 is in an available state, such as, an event of the first communication device 10 has ended the phone call, an event of the profile being changed from the silence or vibration mode to be a ringing mode, or an event of the system time being arrived at an end time of the meeting for example.

In block S101, the detection module 202 detects whether one of the specific events is triggered. If one of the specific events is triggered, block S102 is implemented. If no specific event is triggered, block S101 is repeated.

In block S102, the compilation module 203 compiles a specific message including predetermined characters and state information of the first communication device 10, according to the triggered specific event. In one embodiment, a normal message package of a SMS message includes different fields, such as a length and a format of a Short Message Service Center (SMSC) address, the SMSC address, a length and a format of the receiver number, the receiver number, an encode mode, an effective duration, a length of a SMS text, and the SMS text. A specific message package of the specific message also includes the above-mentioned fields, and further includes the predetermined characters and the state information added into the first few bytes (e.g. first 8 bytes) in the SMS text field.

The state information represents a status of the first communication device 10, and may include the available state and the busy state. If the first event type is triggered, the compilation module 203 adds the state information of the busy state into the SMS text, and if the second event type is triggered, the compilation module 203 adds the state information of the available state into the SMS text. In one embodiment, because characters of the first 32 of American Standard Code for Information Interchange (ASCII) codes cannot be displayed and edited by the communication devices, the predetermined characters may include characters of the first 32 of the ASCII codes to render a normal message into a specific message.

In block S103, the sending module 204 sends the specific message to second communication device 40 through the network 30 according to the receiver number.

Figure 4:
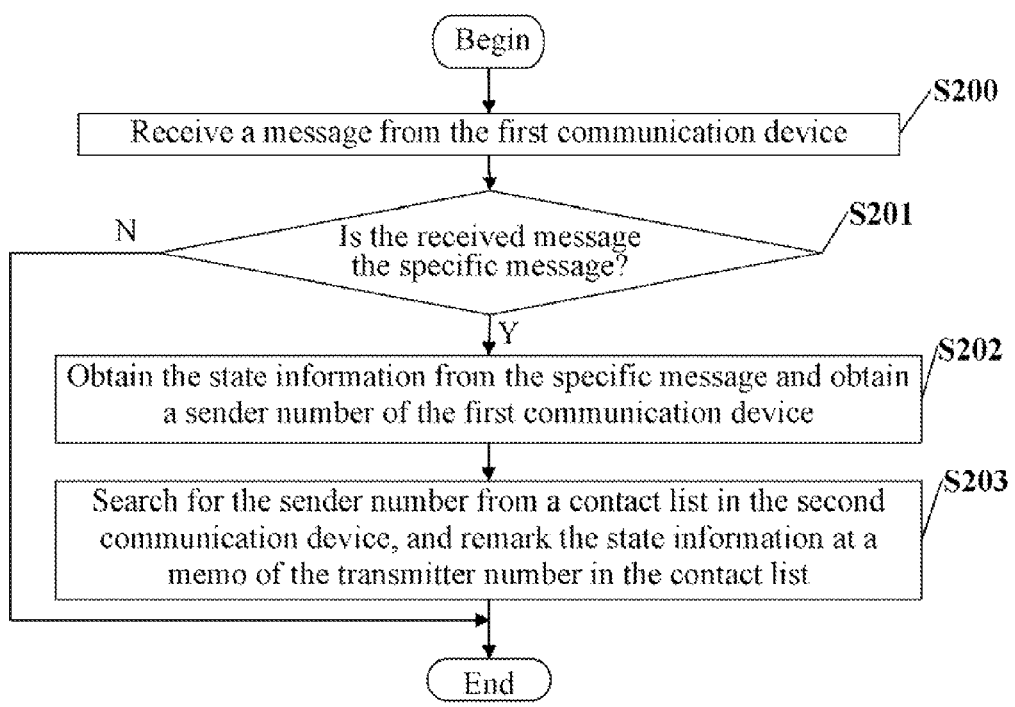
FIG. 4 is a flowchart of one embodiment of an instant information process method for receiving a message by the second communication device of FIG. 1.

FIG. 4 is a flowchart of one embodiment of an instant information process method for receiving a message by the second communication device 1 of FIG. 1. Depending on the embodiment, additional blocks may be added, others deleted, and the ordering of the blocks may be changed.

In block S200, the receiving module 205 receives a message from the first communication device 10 by the network 30.

In block S201, the identification module 206 identifies the received SMS message and determines whether the received message is the specific message. If the identification module 206 recognizes that the field of a SMS text of the received message includes the predetermined characters, the identification module 206 determines that the received message is the specific message, and block S202 is implemented. If the identification module 206 recognizes that the field of a SMS text of the received message does not include the predetermined characters, the identification module 206 determines that the received message is not the specific message, and the procedure ends.

In block S202, the process module 207 obtains the state information of the first communication device 10 from the specific message, and obtains a sender number of the first communication device 10. In one embodiment, the sender number is the phone number of the first communication device 10 that sends the specific message to the second communication device 40.

In block S203, the process module 207 further searches for the sender number from a contact list in the second communication device 40, and marks the state information of the first communication device 10 into a memo of the sender number in the contact list.

All of the processes described above may be embodied in, and fully automated via, functional code modules executed by one or more general purpose processors. The code modules may be stored in any type of non-transitory readable medium or other storage device. Some or all of the methods may alternatively be embodied in specialized hardware. Depending on the embodiment, the non-transitory readable medium may be a hard disk drive, a compact disc, a digital video disc, a tape drive or other suitable storage medium.

The described embodiments are merely possible examples of implementations, and have been set forth for a clear understanding of the principles of the present disclosure. Many variations and modifications may be made without departing substantially from the spirit and principles of the present disclosure. All such modifications and variations are intended to be included herein within the scope of this disclosure and the described inventive embodiments, and the present disclosure is protected by the following claims.

What is claimed is:

1. A method for processing information in a communication device, the method comprising:
setting a plurality of specific events of the communication device and setting a receiver one or more numbers of receiver devices in the communication device;
compiling a specific message comprising predetermined characters and state information of the communication device, upon the condition that one of the specific events is triggered;
sending the specific message to the receiver devices according to the receiver numbers;
identifying a received message and determining whether the received message is the specific message, upon the condition that the communication device receives the received message from a sender device;
obtaining the state information of the sender device from the specific message and obtaining a sender number of the sender device, upon the condition that the received message is the specific message;
searching for the sender number from a contact list in the communication device, and marking the state information of the sender device into a memo of the sender number in the contact list;
wherein the predetermined characters are uneditable characters.

2. The method as claimed in claim 1, wherein the specific events comprise a first event type representing that the communication device is in a busy state and a second event type representing that the communication device is in an available state.

3. The method as claimed in claim 2, wherein the state information comprises the available state and the busy state.

4. The method as claimed in claim 1, wherein the predetermined characters are codes that cannot be displayed and edited by the communication device.

5. The method as claimed in claim 1, wherein the received message is determined to be the specific message, upon the condition that the predetermined characters are found in the received message.

6. A communication device, comprising:
a storage system and at least one processor; and one or more programs that are stored in the storage system and executed by the at least one processor, the one or more programs comprising:
a setting module that sets a plurality of specific events of the communication device and sets receiver one or more numbers of receiver devices in the communication device;
a compilation module that compiles a specific message comprising predetermined characters and state information of the communication device, upon the condition that one of the specific events is triggered;
a sending module that sends the specific message to the receiver devices according to the receiver numbers;
an identification module that identifies a received message and determines whether the received message is the specific message, upon the condition that the communication device receives the received message from a sender device;
a process module that obtains the state information from the specific message and obtains a sender number of the sender device, upon the condition that the received message is the specific message;
the process module further searches for the sender number from a contact list in the communication device, and remarks the state information of the sender device into a memo of the sender number in the contact list;
wherein the predetermined characters are uneditable characters.

7. The communication device as claimed in claim 6, wherein the identification module determines that the received message is the specific message, upon the condition that the predetermined characters are found in the received message.

8. The communication device as claimed in claim 6, wherein the specific events comprise a first event type representing that the communication device is in a busy state and a second event type representing that the communication device is in an available state.

9. The communication device as claimed in claim 8, wherein the state information comprises the available state and the busy state.

10. The communication device as claimed in claim 6, wherein the predetermined characters are codes that cannot be displayed and edited by the communication device.

* * * * *